(12) United States Patent
Eagle et al.

(10) Patent No.: US 9,346,983 B2
(45) Date of Patent: May 24, 2016

(54) FLAME RETARDANT STRUCTURAL EPOXY RESIN ADHESIVES AND PROCESS FOR BONDING METAL MEMBERS

(71) Applicant: Dow Global Technologies LLC, Midland, MI (US)

(72) Inventors: Glenn G. Eagle, Bloomfield Hills, MI (US); Andreas Lutz, Galgenen (CH); Gary L. Jialanella, Oxford, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/368,916

(22) PCT Filed: Mar. 22, 2013

(86) PCT No.: PCT/US2013/033409
§ 371 (c)(1),
(2) Date: Jun. 26, 2014

(87) PCT Pub. No.: WO2013/142751
PCT Pub. Date: Sep. 26, 2013

(65) Prior Publication Data
US 2015/0025176 A1 Jan. 22, 2015

Related U.S. Application Data

(60) Provisional application No. 61/614,541, filed on Mar. 23, 2012.

(51) Int. Cl.
| | |
|---|---|
| C08K 3/22 | (2006.01) |
| C08K 3/38 | (2006.01) |
| C08K 5/3492 | (2006.01) |
| C09J 5/06 | (2006.01) |
| C09J 163/00 | (2006.01) |
| C09J 163/02 | (2006.01) |
| C08K 5/00 | (2006.01) |
| C08K 5/3432 | (2006.01) |
| B23K 11/16 | (2006.01) |
| B23K 11/34 | (2006.01) |
| B23K 31/02 | (2006.01) |
| B32B 37/12 | (2006.01) |
| C08K 13/02 | (2006.01) |
| C08K 3/00 | (2006.01) |

(52) U.S. Cl.
CPC .............. *C09J 163/00* (2013.01); *B23K 11/16* (2013.01); *B23K 11/34* (2013.01); *B23K 31/02* (2013.01); *B32B 37/1207* (2013.01); *C08K 3/0058* (2013.01); *C08K 3/22* (2013.01); *C08K 3/38* (2013.01); *C08K 5/0066* (2013.01); *C08K 5/3432* (2013.01); *C08K 5/34922* (2013.01); *C08K 13/02* (2013.01); *C09J 5/06* (2013.01); *B32B 2037/1253* (2013.01); *B32B 2311/30* (2013.01); *C08K 2003/2227* (2013.01); *C08K 2003/387* (2013.01)

(58) Field of Classification Search
None
See application file for complete search history.

(56) References Cited

U.S. PATENT DOCUMENTS

| | | | |
|---|---|---|---|
| 3,686,359 | A | 8/1972 | Soldatos et al. |
| 4,701,378 | A | 10/1987 | Bagga et al. |
| 4,734,332 | A | 3/1988 | Bagga et al. |
| 5,112,932 | A | 5/1992 | Koenig et al. |
| 5,202,390 | A | 4/1993 | Mulhaupt et al. |
| 5,278,257 | A | 1/1994 | Mulhaupt et al. |
| 8,071,217 | B2 | 12/2011 | Kramer et al. |
| 8,114,519 | B2 | 2/2012 | Kramer et al. |
| 8,202,920 | B2 | 6/2012 | Kramer et al. |
| 2005/0070634 | A1 | 3/2005 | Lutz et al. |
| 2005/0209401 | A1 | 9/2005 | Lutz et al. |
| 2006/0226404 | A1* | 10/2006 | Bauer ................. C09K 21/12 252/601 |
| 2006/0276601 | A1* | 12/2006 | Lutz .................. C08G 18/10 525/528 |
| 2008/0251202 | A1* | 10/2008 | Eagle ................ C08G 59/066 156/330 |
| 2009/0264558 | A1 | 10/2009 | Kramer et al. |
| 2012/0164373 | A1* | 6/2012 | Spencer ........... C08G 59/1488 428/116 |
| 2013/0288031 | A1* | 10/2013 | Labock ................ C09D 5/185 428/215 |

FOREIGN PATENT DOCUMENTS

| | | |
|---|---|---|
| CN | 101921557 B | 10/2013 |
| EP | 222298 A2 * | 11/1986 |
| EP | 0222298 B1 | 5/1991 |
| EP | 1632533 B1 | 10/2013 |
| WO | 2005118734 A1 | 12/2005 |
| WO | 2011123356 A2 | 10/2011 |
| WO | 2012000171 A1 | 1/2012 |

OTHER PUBLICATIONS

Chen et al., "Synergistic Benefits of Metal Hydroxides and Zinc Borate in Flame Retardant Wire and Cable Performance Compounds," IWCS 2005, 7 pages.*

(Continued)

*Primary Examiner* — Robert Sellers
(74) *Attorney, Agent, or Firm* — Hong J. Xu

(57) ABSTRACT

A heat-curable structural adhesive includes at least one non-rubber-modified epoxy resin; an optional rubber or toughener, one or more epoxy curing agents, one or more epoxy curing catalysts; and a flame retardant mixture that includes (i) alumina trihydrate, (ii) zinc borate and (iii) melamine or a melamine derivative. The structural adhesive is useful for bonding metals to other materials or metals to other metals. The structural adhesive strongly resists ignition when welding is performed in the presence of the uncured material, and does not interfere significantly with weld performance.

11 Claims, No Drawings

(56) References Cited

OTHER PUBLICATIONS

Shen et al., "Adhesive Placement in Weld-Bonding Multiple Stacks of Steel Sheets," Welding Journal, vol. 91, Feb. 2012, pp. 59-s to 66-s.*

Von Bonin, W., Patent Abstract for EP0222298, "Intumescent masses based on an epoxy resin and containing fillers", May 8, 1991, Bayer AG.

Li, G., Patent Abstract for CN101921557, "Halogen-free flame-retardant adhesive composition and flexible copper-clad plate using same", Oct. 16, 2013, Allstar Tech Zhongshan Co. Ltd.

* cited by examiner

FLAME RETARDANT STRUCTURAL EPOXY RESIN ADHESIVES AND PROCESS FOR BONDING METAL MEMBERS

This invention relates to a flame-retardant epoxy-based structural adhesive and a process for bonding metal members via both welds and an adhesive bond.

Structural adhesives are frequently used in metal-to-metal bonding applications. The adhesive bond sometimes replaces conventional welding or mechanical fasteners. Sometimes, however, a combination of welding and adhesive bonding is used. In those cases, the adhesive bonding reduces the number of welds that are needed. In the manufacture of an automobile, dozens or even hundreds of welds can be eliminated through adhesive bonding. This can lead to significant increases in production rates as well as reductions in production costs.

Bonding is accomplished by applying a layer of the adhesive between the metal members to form a bondline. The members are then welded, with the weld(s) often extending adjacent to or even though the heat-curable adhesive layer. After the welding step, the assembly is heated to cure the adhesive.

Being an organic material, the structural adhesive can and will burn if exposed to sufficiently high temperatures in the presence of oxygen. Because these conditions are present during the welding step, it is not uncommon for the adhesive to catch fire. This is a concern from both a safety and a product quality standpoint. The problem is becoming more prevalent as manufacturers shift from conventional alternating current (AC) welding to mid-frequency direct current (MFDC) welding. Higher temperatures often are produced during MFDC welding, and as a result there is a greater risk of igniting the adhesive.

Therefore, there is a desire to reduce the incidence of adhesive burning during the welding operation. The preferred way of accomplishing this is through modifications in the structural adhesive itself (rather than through modifications to the welding regimen), so the adhesive becomes more resistant to ignition.

Alumina trihydrate is sometimes used as a flame retardant in these structural adhesives. Very high concentrations are needed to be effective, particularly under the higher temperature conditions encountered in HFDC welding. These high concentrations of alumina trihydrate have been found to interfere with the welding process. A non-performing or poorly-performing weld often is produced. Therefore, reductions in flammability are achieved at the expense of reduced weld strength, which is unacceptable.

Therefore, a need exists to provide a structural adhesive which is resistant to burning under welding conditions (and MFDC welding conditions especially), which exhibits adequate bonding properties and which does not adversely affect weld formation.

This invention is in one aspect a heat-curable structural adhesive, comprising
A) at least one non-rubber-modified epoxy resin;
B) one or more epoxy curing agents;
C) one or more epoxy curing catalysts; and
D) a flame retardant mixture that includes (i) alumina trihydrate, (ii) zinc borate and (iii) melamine or a melamine derivative.

This structural adhesive is highly resistant to burning and cures to form a strong and flexible adhesive bond. The structural adhesive has little if any adverse affect on the welding process. The structural adhesive is generally formulated as a one-component type, but can be formulated as a two-component type.

The invention is also a process for bonding and welding metal members together, comprising the steps of
a) forming a layer of a heat-curable structural adhesive between and in contact with a pair of metal members to produce an uncured assembly;
b) welding the uncured assembly to form one or more welds between the pair of metal members; and then
c) heating the assembly to cure the structural adhesive and form an adhesive bond between the pair of metal members, wherein the structural adhesive comprises
A) at least one non-rubber-modified epoxy resin;
B) one or more epoxy curing agents;
C) one or more epoxy curing catalysts; and
D) a flame retardant mixture that includes (i) alumina trihydrate, (ii) zinc borate and (iii) melamine or a melamine derivative.

The heat-curable structural adhesive contains at least one non-rubber-modified epoxy resin, by which it is meant an epoxy resin that is not (prior to curing) chemically bonded to a rubber. The non-rubber-modified epoxy resin preferably will constitute at least about 25 weight percent of the heat-curable structural adhesive, more preferably at least about 30 weight percent. The non-rubber-modified epoxy resin may constitute up to about 55 weight percent of the heat-curable structural adhesive, more preferably up to about 45 weight percent and still more preferably up to 40 weight percent. These amounts include any free epoxy resin contained in an optional rubber-modified epoxy resin composition as described below, as well as any free epoxy resin in which core-shell rubber particles are dispersed, also as described below.

The non-rubber modified epoxy resin or resins preferably has an average epoxy equivalent weight of 170 to 600, more preferably from 170 to 500 and still more preferably from 170 to 400.

A wide range of epoxy resins are suitable as the non-rubber-modified epoxy resin, including those described at column 2 line 66 to column 4 line 24 of U.S. Pat. No. 4,734,332, incorporated herein by reference. The non-rubber-modified epoxy resin should have an average of at least 2.0 epoxide groups per molecule.

A preferred type of non-rubber modified epoxy resin is a diglycidyl ether of a polyhydric phenol compound such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol. Resins such as these can have average epoxy equivalent weights of about 170 to 2000 or more, preferably 225 to 400. Examples of epoxy resins of this type include diglycidyl ethers of bisphenol A such as are sold by Dow Chemical under the designations D.E.R.® 330, D.E.R.® 331, D.E.R.® 332, D.E.R.® 383, D.E.R. 661 and D.E.R.® 662 resins. An especially preferred non-rubber-modified epoxy resin is a mixture of at least one diglycidyl ether of a polyhydric phenol, preferably bisphenol-A or bisphenol-F, having an epoxy equivalent weight of 170 to 299, especially 170 to 225, and at least one second diglycidyl ether of a polyhydric phenol, again preferably bisphenol-A or bisphenol-F, this one having an epoxy equivalent weight of at least 300, preferably 300 to 2000 and more preferably 310 to 600. Such an especially preferred non-rubber modified epoxy resin mixture may include up to 20%, more preferably up to 10%, by weight of another type of epoxy resin as described below.

Other useful non-rubber-modified epoxy resins (any of which can be used by themselves or in admixture with one or more others) include, for example, diglycidyl ethers of aliphatic glycols and polyether glycols, such as the diglycidyl ethers of $C_{2-24}$ alkylene glycols and poly(ethylene oxide) or poly(propylene oxide) glycols (including those sold as D.E.R.® 732 and D.E.R.® 736 by Dow Chemical); polyglycidyl ethers of phenol-formaldehyde novolac resins (epoxy novolac resins), including those sold as D.E.N.® 354, D.E.N.® 431, D.E.N.® 438 and D.E.N.® 439 by Dow Chemical; alkyl substituted phenol-formaldehyde resins; phenol-hydroxybenzaldehyde resins; cresol-hydroxybenzaldehyde resins; dicyclopentadiene-phenol resins; cycloaliphatic epoxides including (3,4-epoxycyclohexyl-methyl)-3,4-epoxy-cyclohexane carboxylate, bis-(3,4-epoxycyclohexyl) adipate, vinylcyclohexene monoxide as well as others as described in U.S. Pat. No. 3,686,359; oxazolidone-containing compounds as described in U.S. Pat. No. 5,112,932; dicyclopentadiene-substituted phenol resins; and advanced epoxy-isocyanate copolymers such as those sold commercially as D.E.R. 592 and D.E.R. 6508 (Dow Chemical).

The heat-curable structural adhesive preferably includes at least one liquid rubber-modified epoxy resin, at least one core shell rubber, at least one reactive elastomeric toughener containing capped isocyanate groups, or a mixture of two or more thereof. The structural adhesive preferably contains (i) at least one of a liquid rubber-modified epoxy resin and a core shell rubber (or both) and (ii) at least one reactive elastomeric toughener containing capped isocyanate groups.

A rubber-modified epoxy resin for purposes of this invention is a reaction product of an epoxy resin and at least one liquid rubber that has epoxide-reactive groups, such as amino or preferably carboxyl groups. The resulting material has reactive epoxide groups which allow the adduct to react further when the heat-curable structural adhesive is cured. It is preferred that at least a portion of the liquid rubber has a glass transition temperature ($T_g$) of −30° C. or lower, especially −40° C. or lower. The rubber $T_g$ may be as low as −100° C. or even lower. These glass transition temperatures, as are others described herein, are conveniently measured by differential scanning calorimetry.

The liquid rubber is preferably a homopolymer or copolymer of a conjugated diene, especially a diene/nitrile copolymer. The conjugated diene is preferably butadiene or isoprene, with butadiene being especially preferred. The preferred nitrile monomer is acrylonitrile. Preferred copolymers are butadiene-acrylonitrile copolymers. The rubber preferably contains from about 1.5, more preferably from about 1.8, to about 2.5, more preferably to about 2.2, epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

Other suitable rubber materials include amine-terminated polyethers, fatty acids (which may be dimerized or oligomerized), and elastomeric polyesters.

The rubber-modified epoxy resin is formed by reaction of the rubber with an excess of an epoxy resin. A wide variety of epoxy resins can be used to make the rubber-modified epoxy resin, including any of those described above. Enough of the epoxy resin is provided to react with substantially all of the epoxide-reactive groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, more than two equivalents of epoxy resin are provided per equivalent of epoxy-reactive groups provided by the rubber, as this forms a mixture of the rubber-modified epoxy resin and some free (unreacted) epoxy resin, and also helps to minimize advancement. The presence free epoxy resin tends to decrease the viscosity of the product. Any such free epoxy resin in the mixture counts as part of the non-rubber-modified epoxy resin content of the adhesive.

Suitable core-shell rubbers are particulate materials having a rubbery core. The rubbery core preferably has a $T_g$ of less than −20° C., more preferably less than −50° C. and even more preferably less than −70° C. The $T_g$ of the rubbery core may be below −100° C. The core-shell rubber also has at least one shell portion that preferably has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked or both. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer, which can react with an epoxy resin or an epoxy resin hardener. Glycidyl groups such as are provided by monomers such as glycidyl methacrylate are suitable.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. The epoxy resin contained in those products will form all or part of the non-rubber-modified epoxy resin component of the structural adhesive of the invention.

The total rubber content of the heat-curable structural adhesive of the invention can range from as little as 0 weight percent to as high as 30 weight percent. A preferred rubber content for a crash durable adhesive is from 1 weight percent to as much as 20 weight percent, preferably from 2 to 18 weight percent and more preferably from 4 to 18 weight percent. Total rubber content is calculated for purposes of this invention by determining the weight of core-shell rubber, plus the weight contributed by the liquid rubber portion of any rubber-modified epoxy resin as may be used. No portion of a reactive elastomeric toughener as described below (if present) is considered in calculating total rubber content. In each case, the weight of unreacted (non-rubber-modified) epoxy resins and/or other carriers, diluents, dispersants or other ingredients that may be contained in a core-shell rubber product or rubber-modified epoxy resin is not included. The weight of the shell portion of the core-shell rubber is counted as part of the total rubber content.

The optional but preferred reactive elastomeric toughener is a liquid or low-melting elastomeric material that contains urethane and/or urea groups and has terminal blocked isocyanate groups. Blocked isocyanate groups have been reacted with a compound that has one or more functional groups that can reversibly react with an isocyanate group to form the blocking group.

The reactive elastomeric toughener preferably contains up to 6, more preferably up to four, such blocked isocyanate groups. Tougheners of this type are described, for example, in U.S. Pat. Nos. 5,202,390, 5,278,257, WO 2005/118734, U.S. Published Patent Application No. 2005/0070634, U.S. Published Patent Application No. 2005/0209401, U.S. Published Patent Application 2006/0276601, U.S. Published Patent Application No. 2008/0251202, EP-A-0 308 664, EP-A 1 728 825, EP-A 1 896 517, EP-A 1 916 269, EP-A 1 916 270, EP-A 1 916 272, EP-A-1 916 285 and WO 2012/000171.

Preferably, the weight average molecular weight of the reactive elastomeric toughener is about 8,000 or greater, and more preferably about 10,000 or greater. Preferably, the molecular weight of the toughener is about 70,000 or less, and more preferably about 40,000 or less. Molecular weights as used herein are determined by gel permeation chromatography (GPC). The reactive elastomeric toughener preferably has a viscosity at 45° C. not greater than 1000 Pa·s and more preferably no more than about 800 Pa·s.

The reactive toughener is preferably linear, branched or at most lightly crosslinked, preferably having a crosslink density of about 2 or less and preferably about 1 or less. Crosslink density is the number of attachments between chains of polymers.

The reactive elastomeric toughener advantageously includes at least one polyether, polybutadiene or polyester segment that has a molecular weight of 300 to 3000. The polyether, polybutadiene or polyester segment(s) may form part of a polyurethane and/or polyurea backbone.

The toughener is prepared by forming an isocyanate-terminated prepolymer by reaction of an excess of a polyisocyanate with one or more isocyanate-reactive materials, and then blocking the terminal isocyanate groups through reaction with the blocking agent. The isocyanate-reactive materials preferably include at least one polyether, polybutadiene or polyester segment that has a molecular weight of 300 to 3000 and has isocyanate-reactive groups. The isocyanate-reactive materials also may include one or more low molecular weight crosslinking and/or chain extending compounds.

The polyisocyanate preferably is an aliphatic polyisocyanate such as isophorone diisocyanate, 1,6-hexamethylene diisocyanate, hydrogenated toluene diisocyanate, hydrogenated methylene diphenylisocyanate ($H_{12}MDI$), and the like.

Examples of suitable blocking agents include phenolic compounds, aminophenolic compounds, primary or secondary aliphatic or cycloaliphatic amines, benzyl alcohols, aromatic amines, benzyl amines and thiol compounds. The phenolic and aminophenolic blocking groups are preferred types. The phenolic blocking agents include monophenol compounds such as phenol, alkyl phenols that contain one or more alkyl groups that each may contain from 1 to 30 carbon atoms, naphthol, or a halogenated phenol or naphthol. Other phenolic blocking agents include polyphenols that contain two or more, preferably two, phenolic hydroxyl groups per molecule. Examples of suitable polyphenols include resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof. Aminophenol blocking agents contain at least one primary or secondary amino group and at least one phenolic hydroxyl group. The amino group is preferably bound to a carbon atom of an aromatic ring. Examples of suitable aminophenols include 2-aminophenol, 4-aminophenol, various aminonaphthols, and the like.

The toughener, if present, typically will constitute at least 5 weight percent of the adhesive composition. Better results are typically seen when the amount of toughener is at least 8 weight percent or at least 10 weight percent. The toughener may constitute up to 45 weight percent thereof, preferably up to 30 weight percent and more preferably up to 25 weight percent. The amount of toughener that is needed to provide good properties, particularly good low temperature properties, in any particular adhesive composition may depend somewhat on the other components of the composition, and may depend somewhat on the molecular weight of the toughener.

Preferably, the toughener plus the amount of rubber provided by the rubber-modified epoxy resin and core-shell rubber constitutes 13 to 30%, more preferably 15 to 25% of the total weight of the heat-curable structural adhesive.

The structural adhesive also contains a curing agent. The curing agent is selected together with any catalyst(s) such that the adhesive cures rapidly when heated to a temperature of 80° C. or greater, preferably 140° C. or greater, but cures very slowly if at all at room temperature (~22° C.) and temperatures up to at least 50° C. Suitable curing agents include materials such as boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and/or 4,4'-diaminodiphenylsulphone is particularly preferred.

The curing agent is used in an amount sufficient to cure the composition. Typically, enough of the curing agent is provided to consume at least 80% of the epoxide groups present in the composition. A large excess over that amount needed to consume all of the epoxide groups is generally not needed. Preferably, the curing agent constitutes at least about 1.5 weight percent of the structural adhesive, more preferably at least about 2.5 weight percent and even more preferably at least 3.0 weight percent. The curing agent preferably constitutes up to about 15 weight percent of the structural adhesive composition, more preferably up to about 10 weight percent, and most preferably up to about 8 weight percent.

The structural adhesive will in most cases contain a catalyst to promote the cure of the adhesive, i.e., the reaction of epoxy groups with epoxide-reactive groups on the curing agent and other components of the adhesive. The catalyst is preferably encapsulated or otherwise a latent type, which becomes active only upon exposure to elevated temperatures. The latent types include catalysts that are integrated into a poly(p-vinylphenol) matrix (as described in European patent EP 0 197 892) into a novolac resin (including, for example, those described in U.S. Pat. No. 4,701,378 and WO 2012/000171).

Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl) phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. A preferred catalyst is 2,4,6-tris(dimethylaminomethyl)phenol integrated into a poly(p-vinylphenol) matrix (as described in European patent EP 0 197 892), or 2,4,6-tris (dimethylaminomethyl)phenol integrated into a novolac resin (including, for example, those described in U.S. Pat. No. 4,701,378 and WO 2012/000171).

Preferably, the catalyst is present in an amount of at least about 0.1 weight percent of the structural adhesive, and more preferably at least about 0.5 weight percent. Preferably, the catalyst constitutes up to about 4 weight percent of the structural adhesive, more preferably up to about 1.5 weight percent, and most preferably up to about 0.9 weight percent.

The structural adhesive contains alumina trihydrate, zinc borate and melamine or a melamine derivative such as melamine polyphosphate. These components together may constitute at least 10 percent to as much as 25 weight percent of the weight of the structural adhesive. When the structural adhesive is to be used in a bonding and welding process as described herein, it is preferred that the alumina trihydrate, zinc borate and melamine or melamine derivative together constitute at least 14 weight percent, more preferably at least 14.5 weight percent of the structural adhesive. Structural adhesives for use in the bonding and welding process of the invention preferably contain up to 20 weight percent and more preferably up to 18 weight percent of alumina trihydrate, zinc borate and melamine or melamine derivative combined. Greater amounts of these materials may in some cases interfere with the welding process.

In some embodiments, the structural adhesive contains from 4 to 12 weight percent alumina trihydrate, and from 1 to 8 weight percent each of zinc borate and melamine or melamine derivative, with the combined amounts of those materials constituting from 14 to 25 weight percent, preferably from 14 to 20 weight percent and more preferably from 14.5 to 18 weight percent of the structural adhesive. In other embodiments, the structural adhesive contains from 4 to 10 weight percent alumina trihydrate, and from 2 to 6 weight percent each of zinc borate and melamine or melamine derivative, with the combined amounts of those materials constituting from 14 to 22 weight percent, preferably from 14 to 20 weight percent and more preferably from 14.5 to 18 weight percent of the structural adhesive. In yet other embodiments, the structural adhesive contains from 5 to 8 weight percent alumina trihydrate, and from 4 to 6 weight percent each of zinc borate and melamine or melamine derivative, with the combined amounts of those materials constituting from 14 to 20 weight percent and more preferably from 14.5 to 18 weight percent of the structural adhesive.

The structural adhesive of the invention may contain various other optional components.

The structural adhesive may contain 0.5 to 10 percent, preferably 2 to 5 weight percent of a moisture scavenger. The presence of the moisture scavenger has been found to greatly extend the open time of the structural adhesive at temperatures below 80° C. The moisture scavenger binds (chemically or physio-chemically) free water present in the heat-curable structural adhesive and more preferably will not release the bound water until heated to a temperature of at least 160° C., preferably at least 200° C. Examples of suitable moisture scavengers include calcium oxide, magnesium oxide, phosphorus pentoxide, various molecular sieves and the like. Calcium oxide is preferred. Calcium oxide is conveniently provided in the form of fine particles (preferably less than 100 micrometers in diameter).

At least one filler, rheology modifier and/or pigment is preferably present in the structural adhesive. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of these materials include calcium carbonate, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds or metal powders such as aluminum powder or iron powder. Another filler of particular interest is a microballoon having an average particle size of up to 200 microns and density of up to 0.2 g/cc. The particle size is preferably about 25 to 150 microns and the density is preferably from about 0.05 to about 0.15 g/cc. Heat expandable microballoons which are suitable for reducing density include those commercially available from Dualite Corporation under the trade designation Dualite™, and those sold by Akzo Nobel under the trade designation Expancel™.

Fillers, pigment and rheology modifiers are preferably are used in an aggregate amount of about 2 parts per hundred parts of adhesive composition or greater, more preferably about 5 parts per hundred parts of adhesive composition or greater. They preferably are present in an amount of up to about 25 weight percent of the structural adhesive, more preferably up to about 20 weight percent, and most preferably up to about 15 weight percent.

The speed and selectivity of the cure can be enhanced and adjusted by incorporating a monomeric or oligomeric, addition polymerizable, ethylenically unsaturated material into the structural adhesive. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the structural adhesive as well, in order to provide a source of free radicals to polymerize this material. The inclusion of an ethylenically unsaturated material of this type provides the possibility of effecting a partial cure of the structural adhesive through selective polymerization of the ethylenic unsaturation.

The structural adhesive can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. The adhesive may also contain a thermoplastic powder such as polyvinylbutyral or a polyester polyol, as described in WO 2005/118734.

The adhesive composition can be applied by any convenient technique. It can be applied cold or be applied warm if desired. It can be applied by extruding it from a robot into bead form on the substrate, it can be applied using mechanical application methods such as a caulking gun or any other manual application means, and it can also be applied using jet spraying methods such as a streaming method or a swirl technique. Generally, the adhesive is applied to one or both substrates. The substrates are contacted such that the adhesive is located between and in contact with the substrates to be bonded together.

After application, the structural adhesive is cured by heating to a temperature at which the curing agent initiates cure of the epoxy resin composition. Generally, this temperature is about 80° C. or above, preferably about 140° C. or above. Preferably, the temperature is about 220° C. or less, and more preferably about 180° C. or less.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

The structural adhesive of the invention is especially suitable for use in bonding and welding processes in which a layer of an heat-curable structural adhesive is formed between and in contact with a pair of metal members to produce an heat-curable assembly which is then welded to form one or more welds between the pair of metal members. The assembly is then heated to cure the structural adhesive and form an adhesive bond between the pair of metal members. In an especially preferred embodiment, at least one and preferably both of the metal members is steel, and the welding step is performed using mid-frequency direct current welding. The mid-frequency direct current welding step typically operates at a frequency of 400 to 2000 $sec^{-1}$, preferably about 800 to 1200 $sec^{-1}$. The heat-curable structural adhesive of this invention has been found to be highly resistant to igniting and burning even under the higher temperature conditions often encountered during the welding process, and does not interfere significantly with the welding process itself or the quality of the weld.

Assembled automotive frame members are usually coated with a coating material that requires a bake cure. The coating is typically baked at temperatures that may range from 140° C. to over 200° C. In such cases, it is often convenient to apply the structural adhesive to the frame components, perform the welding step, then apply the coating, and cure the adhesive at the same time the coating is baked and cured.

The adhesive composition once cured preferably has a Young's modulus, at 23° C., of about 1000 MPa as measured according to DIN EN ISO 527-1. Preferably the Young's modulus is about 1200 MPa or greater, more preferably at least 1500 MPa. Preferably, the cured adhesive demonstrates a tensile strength at 23° C. of about 20 MPa or greater, more preferably about 25 MPa or greater, and most preferably about 35 MPa or greater. Preferably, the lap shear strength of a 1.5 mm thick cured adhesive layer on cold rolled steel (CRS) and a galvanized coated steel at 23° C. is about 15 MPa or greater, more preferably about 20 MPa or greater, and most preferably about 25 MPa or greater measured according to DIN EN 1465. The impact peel strength at 23° C. on those substrates is preferably at least 20 N/mm, more preferably at least 30 N/mm and still more preferably at least 40 N/mm, when measured according to the ISO 11343 wedge impact method.

The cured adhesive of the invention demonstrates excellent adhesive properties (such as lap shear strength and impact peel strength).

The following examples are provided to illustrate the invention but are not intended to limit the scope thereof. All parts and percentages are by weight unless otherwise indicated.

EXAMPLES 1-2 AND COMPARATIVE SAMPLES A-D

One-component heat-curable structural adhesive Examples 1-2 and Comparative Samples A-D are prepared by mixing the components listed in Table 1.

TABLE 1

| Ingredient | Comp. A | Comp. B | Comp. C | Comp. D | Ex. 1 | Ex. 2 |
|---|---|---|---|---|---|---|
| Rubber-Modified Epoxy Resin A[1] | 23.8 | 23.8 | 23.8 | 23.8 | 23.8 | 26.5 |
| Non-Rubber-Modified Epoxy Resin[2] | 44.0 | 44.0 | 44.0 | 44.0 | 44.0 | 31.6 |
| Reactive Toughener A[3] | 9 | 9 | 9 | 9 | 9 | 0 |
| Reactive Toughener B[4] | 0 | 0 | 0 | 0 | 0 | 12 |
| Epoxy Silane[5] | 0.4 | 0.4 | 0.4 | 0.4 | 0.4 | 0.3 |

TABLE 1-continued

| Ingredient | Comp. A | Comp. B | Comp. C | Comp. D | Ex. 1 | Ex. 2 |
|---|---|---|---|---|---|---|
| Colorants | 0.2 | 0.2 | 0.2 | 0.20 | 0.2 | 0.2 |
| Dicyanamide | 5.4 | 5.4 | 5.4 | 5.4 | 5.4 | 4.0 |
| Wollastonite | 12.3 | 0 | 0 | 0 | 0 | 0 |
| Alumina Trihydrate | 0 | 30.0 | 18.0 | 15.0 | 6.6 | 7.8 |
| Zinc Borate | 0 | 0 | 0 | 0 | 4.2 | 5.0 |
| Melamine | 0 | 0 | 0 | 0 | 4.2 | 5.0 |
| CaO | 0 | 0 | 0 | 0 | 1.0 | 3.0 |
| Fumed Silica | 4.4 | 4.4 | 4.4 | 4.4 | 4.4 | 4.0 |
| Amine Catalyst A[6] | 0.5 | 0.5 | 0.5 | 0.5 | 0.5 | 0 |
| Amine Catalyst B[7] | 0 | 0 | 0 | 0 | 0 | 0.7 |
| Wt-% Flame Retardants | 0 | 25.5 | 17.0 | 14.6 | 14.6 | 17.8 |

[1] A reaction product of 80% by weight of a mixture of a diglycidyl ether of bisphenol F and a solid bisphenol A-type epoxy resin with 20% by weight of a carboxyl-terminated butadiene/acrylonitrile rubbers sold by Noveon as Hycar ® 1300X13.
[2] A ether of bisphenol A sold by The Dow Chemical Company as D.E.R.™ 331.
[3] An isocyanate-terminated polyurethane prepolymer prepared from a polyether polyol and an aliphatic diisocyanate, in which the isocyanate groups are capped with o,o-diallyl bisphenol A, and is made as described in Example 13 of EP 308 664.
[4] An isocyanate-terminated prepolymer made in the same manner as Reactive Toughener A, except the capping groups are phenol.
[5] Dynasilan A189 from Evonik Industries AG, Frankfurt, Germany.
[6] A commercially available amine catalyst containing 1-(2-(2-hydroxybenzamido)ethyl)-2-(2-hydroxyphenyl)-2imidazoline) as the active ingredient.
[7] Amine Catalyst B is 2,4,6-tris(dimethylaminomethyl)phenol integrated into a molten novolac resin, as described in WO 2012/000171.

Duplicate test coupons are prepared and are evaluated for lap shear strength in accordance with DIN EN 1465, using 2 mm-thick 6111 aluminum alloy coated with DC290 lubricant. Testing is performed at a test speed of 10 mm/minute and at 23° C. Test samples are prepared using each adhesive. The bonded area in each case is 25×10 mm. The adhesive layer is 0.2 mm thick. Duplicate test specimens are cured for 30 minutes at 180° C. For some of the samples, another set of duplicate test specimens are cured for 30 minutes at 160° C. Results are as indicated in Table 2.

Impact peel testing is performed in accordance with the ISO 11343 wedge impact method. Testing is performed using an Instron Dynatup 8250 device operated at 2 mm/sec. Test coupons are 100 mm×20 mm with a bonded area of 20×30 mm. The substrate is 0.8 mm-thick cold rolled steel that have been cleaned with acetone before applying the adhesive. Impact peel testing is performed on samples cured for 10 minutes at 180° C. In some cases, impact peel testing is also performed on samples cured for 10 minutes at 160° C. Results are as indicated in Table 2.

Flammability is evaluated using a proprietary test spot welding flammability test designated as Ford Laboratory Test Method BV 114-01. According to this test, a layer of the heat-curable structural adhesive is formed between two cleaned, 1 mm cold rolled low carbon steel panels, and a series of 34 welds are performed at specified spatial intervals via mid frequency DC. This test is repeated for five test specimens for a total of 170 welds. The panels are observed during the welding to see if the structural adhesive ignites. A "pass" rating is assigned if (a) the structural adhesive catches fire during four or fewer of the 170 welds and (b) any burning that occurs self-extinguishes within 30 seconds. A "fail" rating means that the structural adhesive catches fire during five or more of the welds, or in any case if any burning that occurs fails to self-extinguish within 30 seconds.

The performance of the welding is evaluated using a proprietary welding acceptance test for weld through sealers designated as Ford Laboratory Test Method BV 109-01. In this test, a bead of the structural adhesive is applied between two cleaned, 1 mm cold rolled low carbon steel panels. The panels are then welded through the adhesive. 25 duplicate samples are welded. The sine wave trace for each weld is examined; an acceptable weld ("pass") is indicated when the sine wave trace exhibits 90% of full welding current on or before the second half of the cycle for all welds. In the case of one or more of unacceptable welds, the test fails and the number of unacceptable welds is reported. Results are indicated in Table 2.

TABLE 2

| Test | Comp. A | Comp. B | Comp. C | Comp. D | Ex. 1 | Ex. 2 |
|---|---|---|---|---|---|---|
| Lap Shear Strength, 180 C. cure, MPa | 33 | 28.3 | 30.4 | 30.2 | 30.6 | 29.7 |
| Lap Shear Strength, 160 C. cure, MPa | 25 | ND | ND | ND | ND | 24.4 |
| Impact Peel Strength, 180 C. cure, N/mm | 20 | 14.6 | 18.0 | 19.2 | 17.1 | 25.3 |
| Impact Peel Strength, 160 C. cure, N/mm | 14.1 | ND | ND | ND | ND | 20.9 |
| Flammability Weld Test | Fail | Pass | Pass | Fail | Pass | Pass |
| Welding Acceptance Test | Pass | Fail | Fail | ND | Pass | Pass |

ND = not determined.

Comparative Sample A represents the case in which there is no flame retardant in the adhesive. That structural adhesive fails the flammability weld test. Comparative Samples B-D show the effect of adding various levels of aluminum trihydrate to the adhesive. This material permits the adhesive to pass the flammability weld test if enough is used (as in Comparative Samples B and C). However, those samples interfere with the welding, leading to a failure in the welding acceptance test. (Comparative D is not tested for welding acceptance because it fails the flammability weld test). The results of Comparative Samples B-D show that when enough alumina trihydrate is present to allow the adhesive to pass the flammability weld test, the sample no longer can pass the welding acceptance test. The alumina trihydrate interferes with the welding process.

In addition, impact peel data shows that the alumina trihydrate at levels effective to pass the flammability weld test leads to a loss of impact peel strength.

Examples 1 and 2 show that the addition of a flame retardant mixture including alumina trihydrate, zinc borate and melamine permit the structural adhesive to pass both the flammability weld test and the welding acceptance test. In the preferred formulation of Example 2, a significant improvement in impact peel strength also is seen, especially at the lower curing temperature.

The invention claimed is:
1. A heat-curable structural adhesive, comprising
   A) at least one non-rubber-modified epoxy resin;
   B) one or more epoxy curing agents;
   C) one or more epoxy curing catalysts; and
   D) a flame retardant mixture that includes (i) alumina trihydrate, (ii) zinc borate and (iii) melamine,
   and the structural adhesive contains 4 to 12 weight percent contains alumina trihydrate and 1 to 8 weight percent each of zinc borate and melamine, and contains 14 to 25 weight percent combined of alumina trihydrate, zinc borate and melamine.
2. The heat-curable structural adhesive of claim 1 which contains 4 to 10 weight percent alumina trihydrate and 2 to 6 weight percent each of zinc borate and melamine, and contains 14.5 to 22 weight percent combined of alumina trihydrate, zinc borate and the melamine.
3. The heat-curable structural adhesive of claim 1 which contains 5 to 8 weight percent alumina trihydrate and 4 to 6 weight percent each of zinc borate and melamine, and contains 14.5 to 18 weight percent combined of alumina trihydrate, zinc borate and the melamine.
4. The heat-curable structural adhesive of claim 1 which further comprises:
   E) (i) at least one rubber-modified epoxy resin, (ii) at least one core-shell rubber, (iii) at least one reactive elastomeric toughener containing capped isocyanate groups or a combination of any two or more thereof.
5. The heat-curable structural adhesive of claim 4 which has a total rubber content of from 4 to 18% by weight.
6. The heat-curable structural adhesive of claim 4 which contains from 10 to 25% by weight of the elastomeric reactive toughener.
7. The heat-curable structural adhesive of claim 1 which contains from 2 to 5% by weight calcium oxide.
8. The heat-curable structural adhesive of claim 1 wherein component C) includes 2,4,6-tris(dimethylaminomethyl) phenol integrated into a poly (p-vinylphenol) matrix or integrated into a novolac resin.
9. A process for bonding and welding metal members together, comprising the steps of
   a) forming a layer of a heat-curable structural adhesive between and in contact with a pair of metal members to produce an uncured assembly;
   b) welding the uncured assembly to form one or more welds between the pair of metal members; and then
   c) heating the assembly to cure the structural adhesive and form an adhesive bond between the pair of metal member,
   wherein the heat-curable structural adhesive comprises
   A) at least one non-rubber-modified epoxy resin;
   B) one or more epoxy curing agents;
   C) one or more epoxy curing catalysts; and
   D) a flame retardant mixture that includes (i) alumina trihydrate, (ii) zinc borate and (iii) melamine or a melamine derivative,
   and the structural adhesive contains 4 to 12 weight percent contains alumina trihydrate and 1 to 8 weight percent each of zinc borate and melamine or melamine derivative, and contains 14 to 25 weight percent combined of alumina trihydrate, zinc borate and melamine or melamine derivative.
10. The process of claim 9, wherein at least one of the metal members is steel.
11. The process of claim 9, wherein the welding is performed by mid-frequency direct current welding.

* * * * *